Oct. 18, 1927.
A. STUBER
1,645,882
SELF THREADING WINDING MEANS
Filed Dec. 4, 1925    2 Sheets-Sheet 1
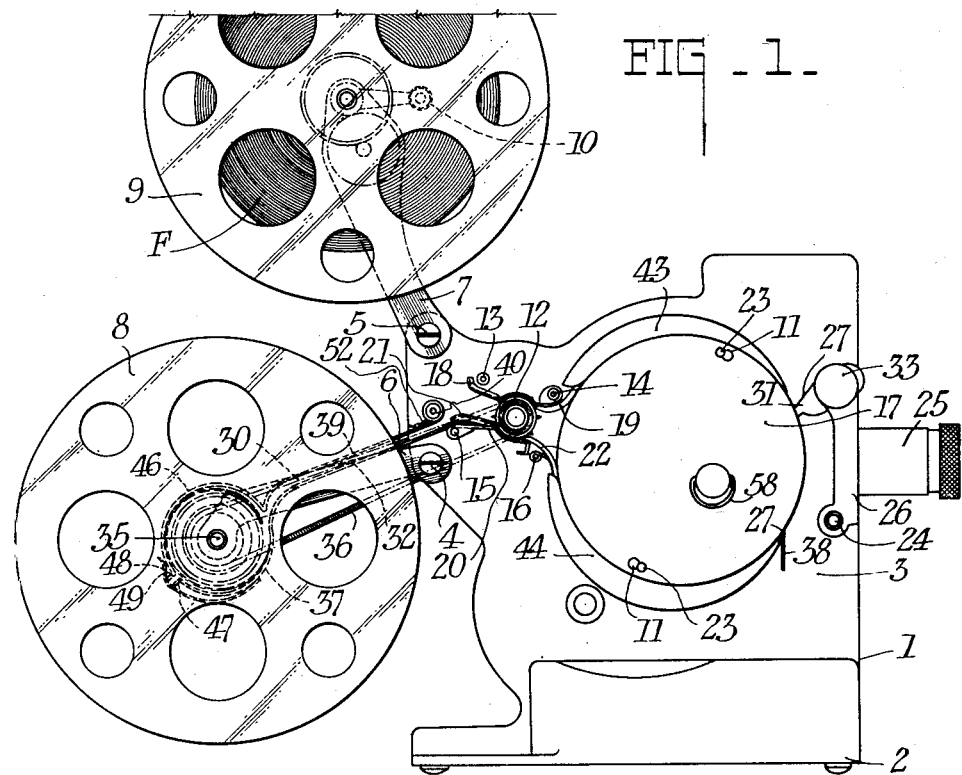
FIG_1_
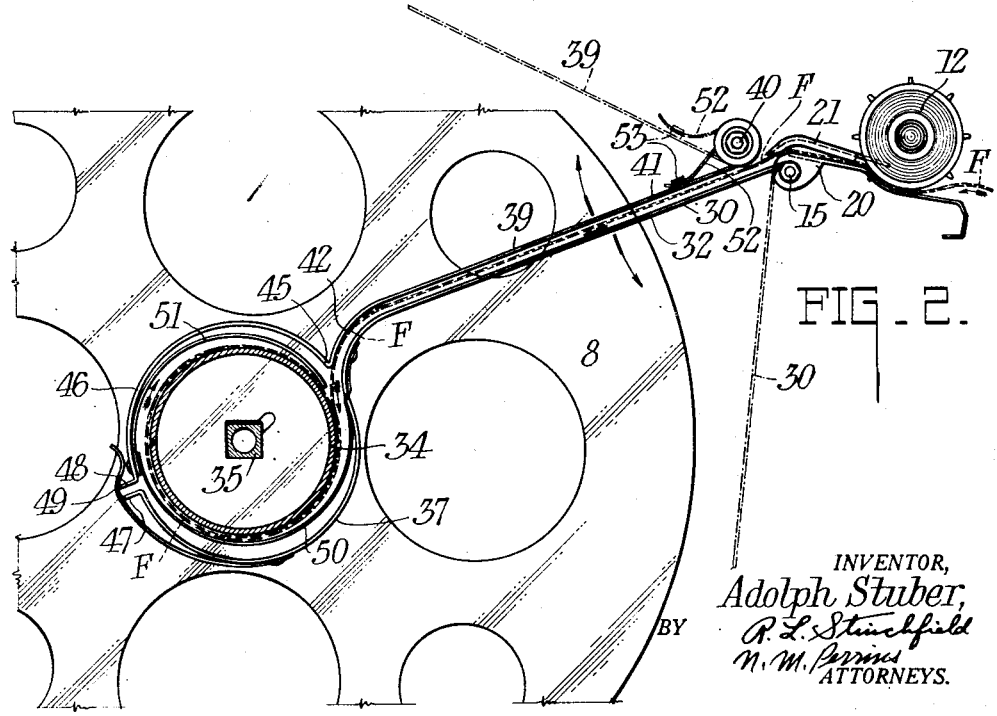
FIG_2_
INVENTOR,
Adolph Stuber,
BY
ATTORNEYS.

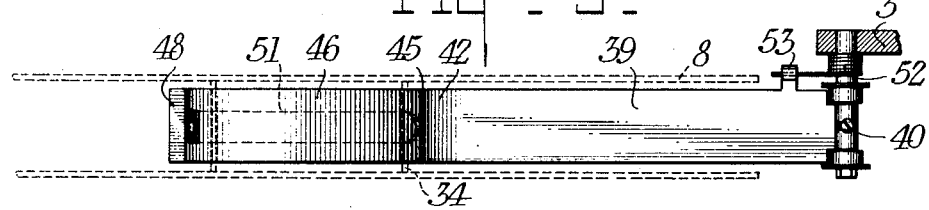
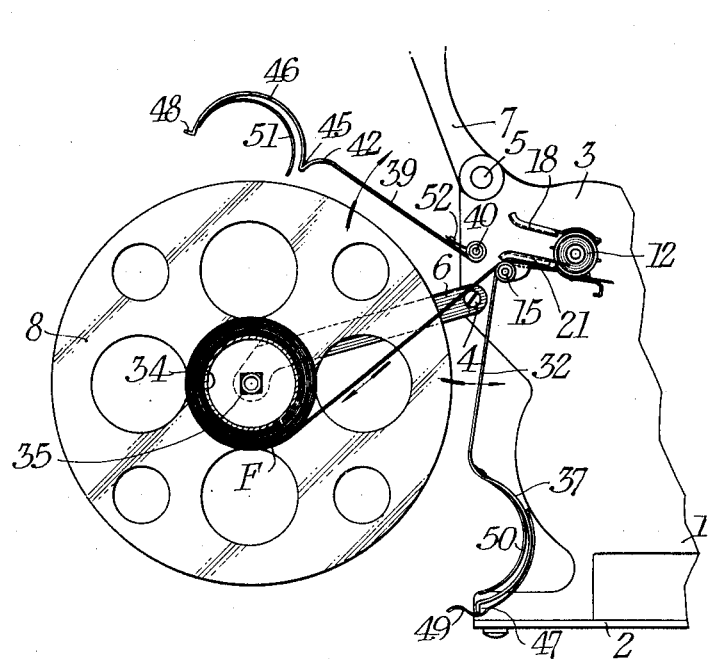

Patented Oct. 18, 1927.

1,645,882

UNITED STATES PATENT OFFICE.

ADOLPH STUBER, OF ROCHESTER, NEW YORK, ASSIGNOR TO EASTMAN KODAK COMPANY, OF ROCHESTER, NEW YORK, A CORPORATION OF NEW YORK.

SELF-THREADING WINDING MEANS.

Application filed December 4, 1925. Serial No. 73,124.

This invention relates to motion picture apparatus and more particularly to such apparatus of the type in which the film is automatically positioned.

The object of the present invention is to provide means making it unnecessary for the user to attach the film to the take-up spool, to render the entire operation of threading the film through the machine an automatic one, to guide the film to the take-up core automatically and to cause it to wind itself tightly and securely thereon.

These and other objects and advantages are attained by my invention as will more clearly appear hereinafter. In the embodiment shown, the film may be automatically threaded through the projector proper and as it emerges from the final feeding means, it is directed into a tunnel or channel by which it is guided to a smooth take-up core. The channel is enlarged to embrace this core and the propelled end of the film is guided around the core about which it coils itself, under the influence of the rotating core and of the film feed, so that it automatically binds itself against the smooth core. As the coil of film increases in size, the pressure becomes so great that a yieldable latch holding the members constituting the guide is forced to give way and these members are rendered inoperative.

A more extended description will now be given, reference being made to the accompanying drawings, wherein the same reference characters refer to the same parts throughout and in which Fig. 1 is a side elevation of a motion picture projector embodying my invention.

Fig. 2 is a detail side view of the automatic guide in closed position.

Fig. 3 is a top view of the guide.

Fig. 4 is a view of the under side of the upper guide member.

Fig. 5 is a detail side view of the guide in open position.

The invention as illustrated is embodied in a projector of the type disclosed in the copending applications filed December 4, 1925, Serial No. 73,119 of E. E. Underwood and the present applicant and Serial No. 73,121 of H. C. Wellman, in which provision is made for the automatic threading of the film through the film advancing parts of the projector proper.

The projector shown has a rigid frame or body 1 of suitable conformation, the principal components being a heavy base 2 and a longitudinal wall 3. On the rear are pivoted at 4 and 5 arms 6 and 7 supporting reels 8 and 9, respectively, the latter having a rewind mechanism 10 and the former my improved automatic guide to be described later.

The wall 3 carries a cylindrical casing only the cover 17 of which is shown, this being removably held in place by studs 23 and bayonet slots 11. The film F is adapted to pass around the casing in a loop being propelled continuously from reel 9 and to reel 8 by sprocket 12. An objective is carried in the usual mount 25 carried by plate 26 pivoted at 33 and held in place by a latch pin 24. Also pivoted at 33 is a spring presser member 27 of which are shown an upper inclined arm 31 and a lower inclined extension 38.

Near sprocket 12 are four pins 13, 14, 15 and 16. Pivoted on pin 14 is a spring pressed guide and pressure member 18 to hold film in contact with the sprocket and limited in its outward movement by pin 13. Upon this pin is also pivoted a guide member 43 partially surrounding the cylindrical casing and extending to the upper end of the pressure member 27. A fixed guide 19 extends from between the flanges of the sprocket to a point on the casing beneath member 43. On pin 15 is pivoted a guide and pressure member 20 normally spring pressed toward the sprocket 12. A fixed guide 21 extends from between the flanges of sprocket 12 above and around pin 15. Pivoted on pin 16 is a guide member 44 partially surrounding the cylindrical casing and extending to the lower end of the pressure member 27. A fixed guide 22 extends from between the flanges of sprocket 12 to a point on the cylindrical casing beneath guide 44. Guides 43 and 44 are connected by links (not shown) adapted to be operated by handle 58 extending through the cover 17 and by which the guides 43 and 44 may be moved to and from the cylindrical casing, the ends of these when closed contacting with and camming out the inclined ends, 31 and 38 of the presser member 27 to form a tunnel or guide for the film around the cylindrical casing.

Also freely pivoted on pin 15 is a guide member 30 which has straight portion 32 of a length sufficient to extend nearly to the core 34 of reel 8 when mounted on its shaft 35 carried by arm 6. This shaft is frictionally driven by a woven wire belt 36 from a pulley (not shown) coaxial with the sprocket. The guide member 30 is bowed at 37 in substantially a semi-circle of somewhat greater radius than the core 34. A complementary guide member 39 is pivotally mounted on a pin 40 spaced slightly from pin 15 and it also has a straight portion 41, terminating in a curve 42 which follows the curve 37 for a short distance, sufficient to start a film end in the direction indicated by an arrow, but is then sharply rebent at 45 to form substantially a semi-circle 46, which with the bow 37 surrounds the core 34. These members have at their ends outwardly directed lips 47 and 48 and a spring latch 49 secured on bow 37 overhangs these lips and holds the guide members yieldably together. Light springs 50 and 51 are secured to the bows 37 and 46 and assist in the guiding action, pressing film gently toward the core. A spring 52 is coiled around pin 40 and its end is secured under a lug 53 carried by guide 39 and tends to move the guide member away from the core.

In operation, the user operates the handle 58 to move guides 43 and 44 to closed position and presser member 27 to open position, thus forming a tunnel-like guide around the cylindrical casing. With the machine running, he then inserts the end of a perforated film F from the supply reel 9 between guide member 18 and the sprocket 12 until the teeth of the sprocket engage the perforations of the film, thereby propelling it. The end is then advanced between guides 18 and 19, then past guide members 43, 27 and 44 to guide 22, by which it is directed between sprocket 12 and guide member 20, being propelled by sprocket 12 between guide members 20 and 21 to the space between pins 15 and 40. The members 32 and 39 being closed constitute a channel or tunnel directing the film to the core 34, the curve 42 causing it to be advanced around the core in the direction that the latter is turning. The end will be propelled easily and smoothly in a coil around the core 34, beneath the gentle springs 50 and 51 and will continue to coil itself around the core more and more tightly under the combined influences of the propelling sprocket, the springs 50 and 51 and the rotating core, until it grips the core tightly. As the size of the coil increases, it will press outwardly more and more on the springs 50 and 51, flattening them against the bows 37 and 46 until the pressure on these is so great that the spring latch 49 yields and the two guides are separated. The upper one is raised by spring 52 and the lower one falls by gravity. The take-up core is now exerting a positive drive on the tightly coiled, self-gripping film and continues to function in the usual way.

It is to be understood that the above disclosure is by way of example and that I contemplate as included in my invention all such modifications and equivalents as properly fall within the scope of the appended claims.

Having thus described my invention, what I claim as new and desire to secure by Letters Patent is:

1. In motion picture apparatus, film winding means, means constituting a guide for directing a propelled film end to said winding means, and means automatically controlled by the convolutions of film wound on said winding means for rendering the guide inoperative.

2. In motion picture apparatus, film winding means, means for causing a propelled film end to be wound automatically upon such film winding means, and means adjacent said film winding means and automatically controlled by the convolutions of the film wound on said winding means for rendering the second named means inoperative.

3. In motion picture apparatus, film winding means, complementary members constituting a guide for directing film to said winding means and means automatically controlled for separating said members and moving them from guiding position when the coil of film wound in convolutions by said winding means attains a predetermined size.

4. In motion picture apparatus, a film winding core, complementary members constituting a tunnel for directing film to said core, and means controlled by the convolutions of film wound on the core for automatically separating said members and thus destroying the tunnel.

5. In motion picture apparatus, a film winding core, guide means leading to and embracing said core whereby film may be directed to and around said core, and means, operated automatically when a predetermined amount of film has been coiled around the core, for rendering said guide means inoperative.

6. In motion picture apparatus, a driven smooth core, guide means leading to and embracing said core whereby a propelled film end may be directed to and around the core and means, automatically operated by a predetermined amount of film coiled around said core, for rendering said guide means inoperative.

7. In motion picture apparatus, a smooth driven core, complementary members constituting a guide leading to said core and having parts embracing said core, whereby a propelled film end may be directed to and around said core, said members being spring pressed apart, but being held operatively together by a yieldable spring latch, whereby when a predetermined amount of film is coiled around the core the pressure therefrom may cause the spring latch to yield and the members will separate.

8. In motion picture apparatus, a smooth driven core, complementary members constituting a guide leading to said core and having parts loosely embracing said core, springs within said embracing parts tending to press film toward the core, a spring tending to separate the members, a latch for holding them together but automatically yieldable when a predetermined amount of film is coiled around the core.

Signed at Rochester, New York, this 30th day of November, 1925.

ADOLPH STUBER.